INVENTORS.
KENNETH E. OPAL &
JOHN S. HESS, JR.
By Murray & Linkhauer
Attorneys

United States Patent Office 3,564,394
Patented Feb. 16, 1971

3,564,394
CHOPPER-TYPE ALTERNATING CURRENT REGULATOR EMPLOYING AMPLITUDE SENSOR AND ZERO CROSSING DETECTOR
Kenneth E. Opal, Oakmont, and John S. Hess, Jr., Pittsburgh, Pa., assignors to Power Control Corporation, Pittsburgh, Pa., a corporation of Pennsylvania
Filed Jan. 3, 1969, Ser. No. 788,789
Int. Cl. G05f 1/44
U.S. Cl. 323—22
7 Claims

ABSTRACT OF THE DISCLOSURE

A fast response time voltage regulator which will maintain the amplitude of an alternating current voltage constant over a relatively wide range of frequencies. This is accomplished by chopping the input alternating current voltage at a frequency much higher than that of the alternating current voltage to be regulated, and thereafter filtering the chopper waveform to reconstruct a true sine wave. By sensing the amplitude of the filtered output and by varying the "ON" and "OFF" times of the chopper as a function of variations in amplitude, said amplitude can be maintained constant.

BACKGROUND OF THE INVENTION

Figure 1:
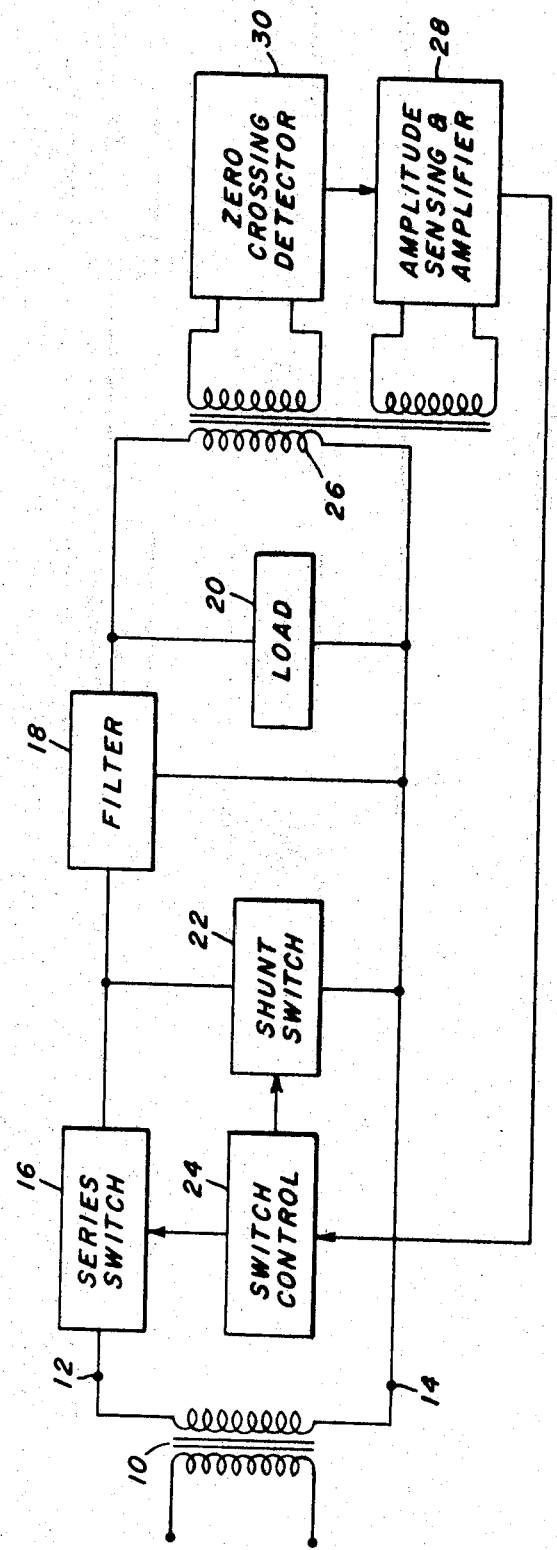

There are many types of electrical equipment, particularly measuring equipment and the like, which cannot tolerate any appreciable changes in line voltage which are bound to ocur in a conventional electrical distribution system. It, therefore, becomes necessary to insert a voltage regulator between the power supply system and the equipment to be powered.

In the past, such voltage regulators have often taken the form of a constant voltage transformer. While such transformers will maintain the amplitude of an output sine wave constant at a specific, predetermined frequency, the circuitry is essentially resonant in character; and changes in the input frequency will cause changes in the output amplitude due to changes in circuit impedance with changes in frequency.

SUMMARY OF THE INVENTION

As one object, the present invention seeks to provide a new and improved voltage regulator which will maintain the amplitude of an alternating current output voltage constant over a relatively wide input frequency range.

More specifically, an object of the invention is to provide a voltage regulator of the type described wherein the input waveform is chopped and thereafter filtered to produce a sine wave, the "ON" and "OFF" times of the chopping apparatus being regulated as a function of the amplitude of the reconstructed waveform.

In accordance with the invention, a voltage regulator is provided comprising a pair of input terminals to which an input alternating current voltage to be regulated is applied, together with means for chopping the input alternating current voltage at a frequency higher than that of the voltage to be regulated. The output of the chopping means is filtered to reconstruct a true sine wave, while means are provided for sensing the amplitude of the reconstructed sine wave and for varying the "ON" and "OFF" times of the chopping means as a function of that amplitude whereby the amplitude of the output sine wave may be maintained constant.

Preferably, the input alternating current voltage is applied to the circuitry through an input transformer, while the chopping means comprises a first alternating current switch in series with the secondary winding of the input transformer, together with a second alternating current switch in shunt with the secondary winding. While the series switch is "OFF" the shunt switch is "ON" and vice versa. When the series switch is "ON," load current flows through it and into the filter and then to a load. Conversely, when the series switch is "OFF" and the shunt switch is "ON," the voltage at the input to the filter is clamped and current can circulate from the load, which inherently contains inductive elements, through the filter and the shunt switch which acts as a clamp. In this manner, the voltage across the series switch is prevented from rising above the input transformer secondary voltage when it shuts off.

In order to sense the amplitude of the reconstructed sine wave signal the output of the filter is full-wave rectified and used to charge capacitors to a level proportional to the peak of the regulator output voltage. These capacitors are alternately discharged each time the input alternating current voltage crosses zero. In this manner, a signal proportional to output amplitude is continually updated, enabling a fast response time characteristic. The resulting direct current signal, proportional to output amplitude, is then used to control the "OFF" and "ON" times of the chopper circuit.

Figure 2:
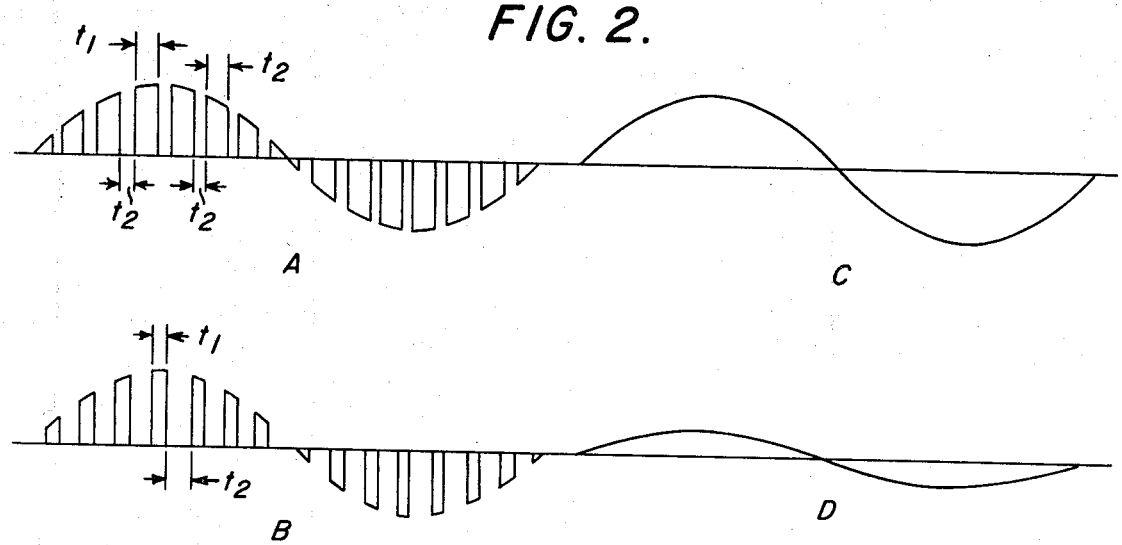
Figure 4:
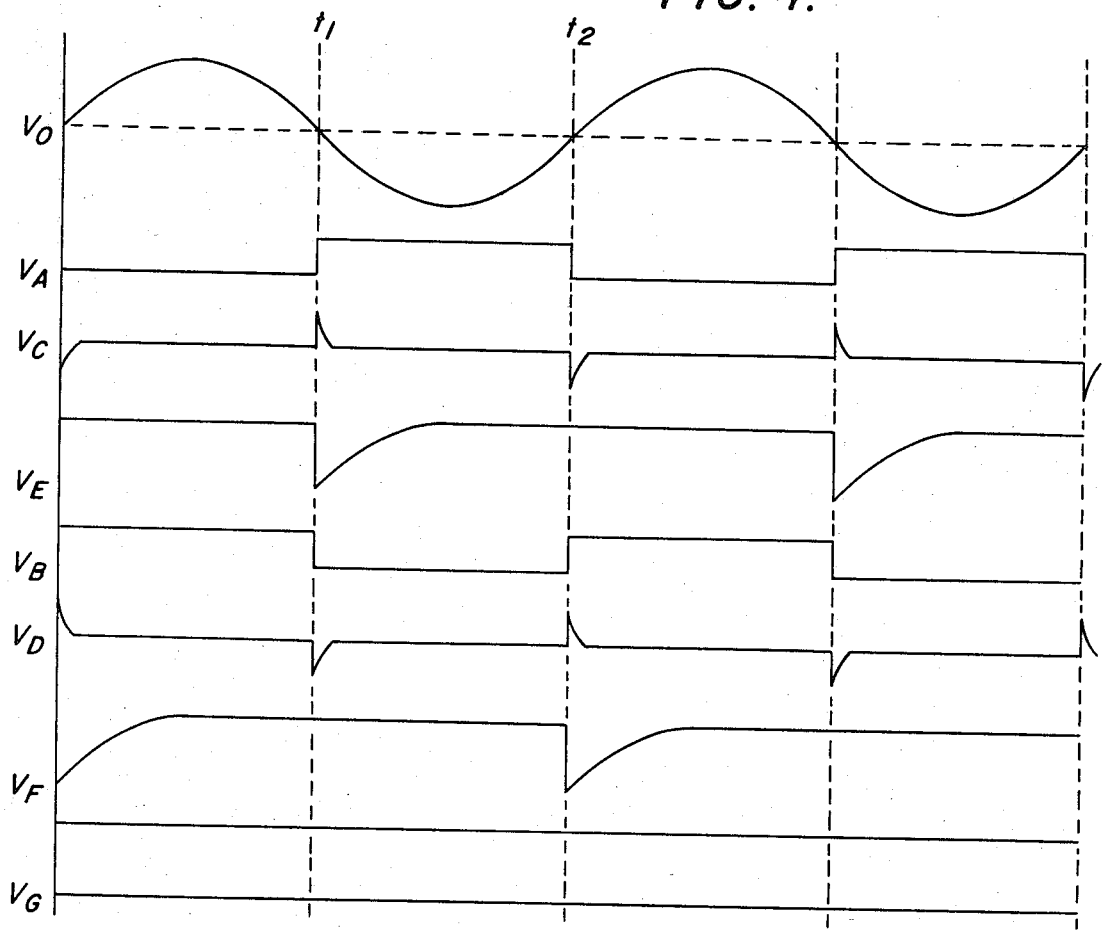
Figure 3:
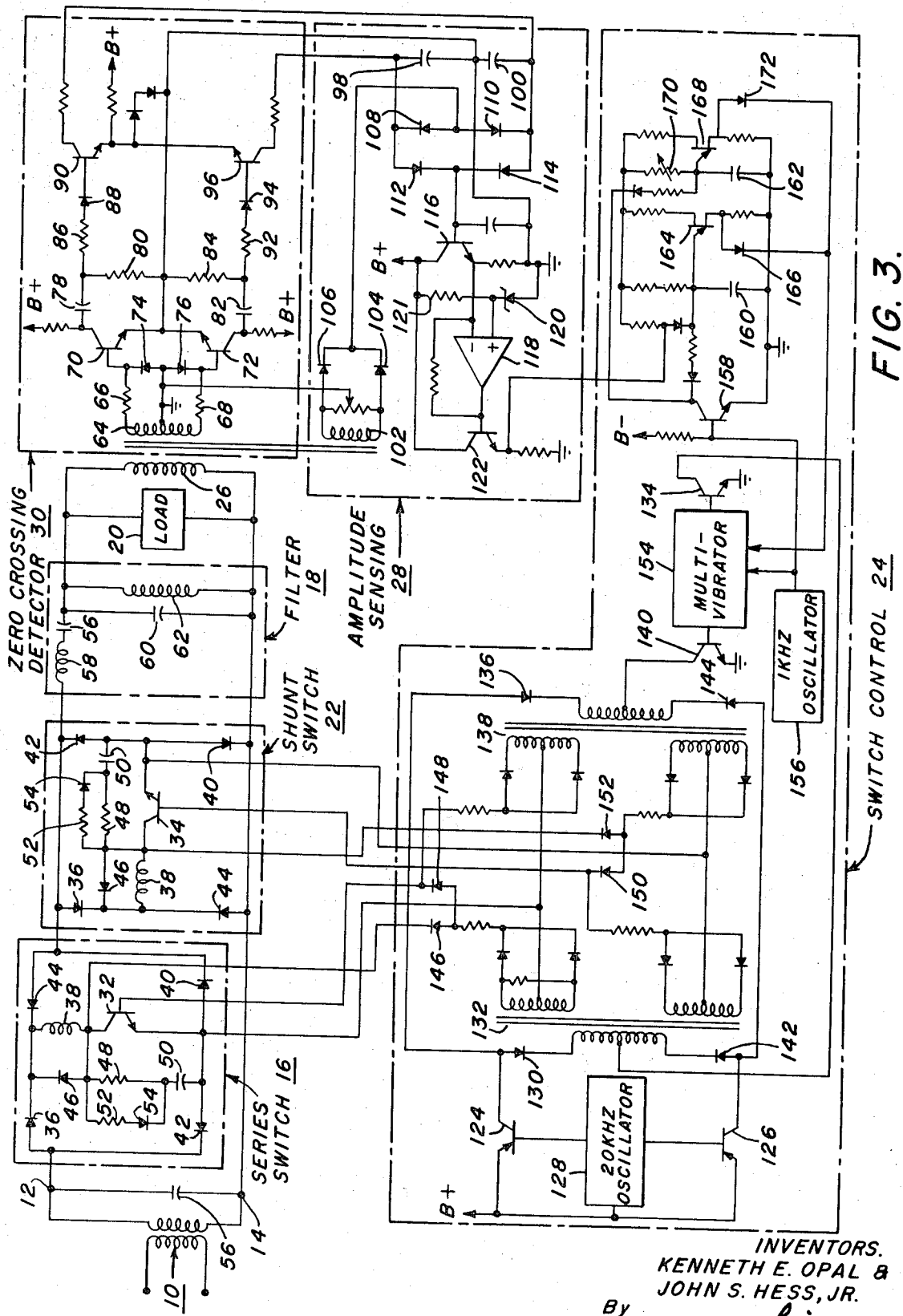

The above and other objects and features of the invention will become apparent from the following detailed description taken in connection with the accompanying drawings which form a part of this specification, and in which:

FIG. 1 is a block diagram of the voltage regulator of the present invention;

FIG. 2 comprises waveforms illustrating the operation of the circuit of FIG. 1;

FIG. 3 is a detailed block and schematic circuit diagram of the voltage regulator of the present invention; and FIG. 4 comprises waveforms illustrating the operation of the zero crossing and amplitude sensing circuitry of FIG. 3.

With reference now to the drawings, and particularly to FIG. 1, an alternating current voltage to be regulated is applied through input transformer 10 to two input terminals 12 and 14. Input terminal 12 is connected through a series switch 16 and filter 18 to one side of a load impedance 20, the other side of the load being connected directly to the input terminal 14. Connected between the junction of switch 16 and filter 18 is a shunt switch 22. The switches 16 and 22 are controlled by a switch control circuit 24 such that the two switches are switched ON and OFF alternately at a high frequency rate, much higher than the supply line frequency. For example, the supply line frequency may be 60 cycles per second; whereas the switches 16 and 22 are switched ON and OFF at a frequency of 1 kilocycle.

Thus, switch 22 is OFF when switch 16 is ON, and vice versa. When switch 16 is closed or "ON," load current flows through it into the filter 18 and thence to the load 20. However, with switch 16 OFF and switch 22 ON, the voltage at the input to the filter is clamped and current can circulate from the load 20, which will inherently contain inductive elements, into the filter 18 and the clamp comprising the shunt switch 22. This prevents the voltage across switch 16 from rising above the supply voltage.

The sinusoidal voltage appearing across the load 20 is applied through transformer 26 to an amplitude sensing and amplifying circuit 28. Circuit 28 will hereinafter be descirbed in greater detail but, in essence, comprises a pair of capacitors which are alternately charged on successive half cycles of the output waveform appearing across load 20, the charge on the capacitors being proportional to the amplitude of the output waveform.

Also connected to a secondary winding of transformer 26 is a zero crossing detector 30 which alternately discharges one of the aforesaid two capacitors each time the output waveform crosses zero. In this manner, the output amplitude value is continually updated, resulting in an extremely fast response time characteristic which maintains the output amplitude constant.

The output of the amplitude sensing and amplifying circuit 28, comprising a direct current signal proportional to output amplitude, is then applied to the switch control circuit 24 which controls the "OFF" and "ON" times of the series and shunt switches 16 and 22.

The operation of the circuit of FIG. 1 can best be understood by reference to FIG. 2. In waveform A of FIG. 2, the "ON" times of the series switch are represented by the time periods $t_1$; while the "ON" times of the shunt switch 22, with inductive current circulating therethrough, are indicated by the time periods $t_2$. In waveform B, the time periods $t_1$, during which the series switch 16 is "ON," have decreased in width, resulting in less power being supplied to the load; while the "ON" times $t_2$ of the shunt switch 2 have increased. As a result, when waveform A is filtered in filter 18 to reconstruct the sine wave illustrated by waveform C in FIG. 2, it is much higher in amplitude than waveform D which results from filtering of waveform B. If, for example, the amplitude of the output waveform should increase, then the time periods $t_1$ will decrease and time periods $t_2$ increase to lower the amplitude. Conversely, if the amplitude of the output waveform should decrease, the time periods $t_1$ are increased and the time periods $t_2$ decreased to increase output amplitude.

With reference now to FIG. 3, the series and shunt switches 16 and 22 are shown in detail and enclosed by broken lines. Transistors 32 and 34 are the actual series and shunt switching transistors, respectively. During one-half cycle of the applied input waveform, and assuming that the transistor 32 is gated "ON," current will flow through diode 36, inductor 38, transistor 32 and diode 40. During the other half cycle, current will flow through diode 42, transistor 32, inductor 38 and diode 44. The inductor 38 is necessary to limit the rate of rise in magnitude of the currents through transistor 32. Diode 46 is a "free wheeling" diode around the inductor 38. Connected in shunt with the transistor 32 are a resistor 48 and capacitor 50; and in shunt with the resistor 48 are a resistor 52 and diode 54. The combination of resistor 52 and capacitor 50 is necessary to eliminate the voltage spikes across the chopper transistor 32 caused by interruption of current through inductor 38. The R-C time constant of resistor 52 and capacitor 50 is chosen to be equal to or greater than the duration of the voltage spikes developed across the transistor 32. Diode 54 prevents the discharge of capacitor 50 through the charging resistor 52. Registor 48 is used to permit the discharge of capacitor 50 at a rate consistent with the switching frequency involved while still keeping the discharge current to a minimum. The capacitor 50 is discharged when the transistor 32 is switched "ON." Capacitor 56 across input terminals 12 and 14 is included to eliminate the voltage spikes across transistors 32 and 34 caused by interruption of the current through the secondary winding of input transformer 10.

The operation of the circuitry of switch 22 is identical with that of switch 16 and, accordingly, elements in circuit 22 which correspond to those in circuit 16 are identified by like reference numerals.

The filter 18 is relatively straightforward and includes a capacitor 56 and inductor 58 in series with the switch 16, and a capacitor 60 and inductor 62 connected in shunt across the load 20.

The output of the voltage regulator is fed back through transformer 26 to the zero crossing detector 30 and the amplitude sensing and amplifying circuit 28. Taking, first, the zero crossing detector 30, it includes a secondary winding 64 on transformer 26 having its opposite ends connected through resistors 66 and 68 to the bases of transistors 70 and 72, respectively. The bases of transistors 70 and 72 are also connected to ground through diodes 74 and 76. The output of transistor 70 is differentiated in a differentiator comprising capacitor 78 and resistor 80. Similarly, the output of transistor 72 differentiated in a differentiator comprising capacitor 82 and resistor 84. The differentiated output of transistor 70, for example, is then applied through resistor 86 and diode 88 to the base of transistor 90. Likewise, the differentiated output from transistor 72 is applied through resistor 92 and diode 94 to the base of transistor 96. As will be seen, the transistors 90 and 96 provide discharge paths for capacitors 98 and 100, respectively, in the amplitude sensing circuit 28.

The amplitude sensing circuit includes a secondary winding 102 connected through a full-wave rectifier consisting of diodes 104 and 106 to the junction of diodes 108 and 110. The cathodes of diodes 108 and 110 are connected to one terminal of each of the capacitors 98 and 100 and are also connected through diodes 112 and 114 to the base of transistor 116.

Operation of the circuits 28 and 30 may best be understood by reference to FIG. 4 wherein the waveform $V_O$ is the output of the regulator appearing across the secondary windings 64 and 102. The output appearing across the secondary winding 64 alternately drives transistors 70 and 72 "OFF" and "ON" at the regulator output frequency. The resultant collector voltages on the collectors of transistors 70 and 72 are identified as waveforms $V_A$ and $V_B$ in FIG. 4. Note that the transistors 70 and 72 are driven "ON" or "OFF" at the zero crossings of the applied sine wave. After differentiation in the differentiator comprising capacitor 78 and resistor 80, waveform $V_C$ results, wherein positive spiked pulses are produced at the leading edges of the square waves in waveform $V_A$ while negative spiked pulses are produced at the trailing edges. Similarly, differentiation of waveform $V_B$ by circuit elements 82 and 84 produces waveform $V_D$ wherein positive spiked pulses are produced at the leading edge of each square waveform $V_B$ and negative spiked pulses are produced at the trailing edge of each square wave. When waveforms $V_C$ and $V_D$ pass through diodes 88 and 94, only the positive spiked pulses remain and are used to alternately turn on the transistors 90 and 96. In this respect, it will be noted from FIG. 4 that the positive spiked pulses in waveform $V_C$ are spaced 180° in phase with respect to those in waveform $V_D$.

Capacitor 98, for example, is charged through diode 108; while capacitor 100 is charged through diode 110. The waveforms appearing across the capacitors 98 and 100 are illustrated as waveforms $V_E$ and $V_F$ in FIG. 4. Capacitor 98, for example, charges to a voltage proportional to the output amplitude of the applied sine wave, and is discharged at time $t_1$, when a positive spiked pulse appears in waveform $V_C$. Similarly, the capacitor 100 charges to the same voltage proportional to output amplitude and is discharged at time $t_2$. After each capacitor is discharged, it again charges back up to a level proportional to output amplitude; however this level will now reflect any changes in output amplitude. In this manner, output amplitude is continually updated. The result, of course, is that the peak voltage appears at the base of transistor 116 where it is permitted to change to a new value once every half cycle. During the time that one capacitor is discharged, the other capacitor supplies the output. Transistor 116 is necessary to present a very high impedance to the capacitors 98 and 100 and prevent them from discharging through diodes 112 and 114.

The voltage on the emitter of transistor 116, being proportional to the amplitude of the applied sine wave, is applied to one input of a differential amplifier 118. The other input to the differential amplifier 118 comprises a reference voltage supplied by means of a Zener diode 120 having its anode connected to ground and its cathode connected through resistor 122 to a source of B+ potential. The differential amplifier compares the emitter voltage of transistor 116, proportional to output amplitude, with the reference voltage supplied through Zener diode 120 and produces an output error signal which is proportional to the difference between the signal from the sensing circuit and the reference voltage supplied by the diode 120. This error signal is then applied to the base of transistor 122, the emitter of the transistor 122 being connected to the switch control circuit 24.

As will be understood, the purpose of the switch control circuit 24 is to make the necessary adjustments to the relative "ON" and "OFF" times of the two alternating current switches 16 and 22. The drives for the two alternating current switches must be electrically isolated from each other and from the output of the regulator. To accomplish such isolation, a stepdown transformer is used for the feedback signal. Also, the drive for the alternating current switches is transformer coupled. Since the drive signal is a direct current signal, a high frequency carrier system is used. It is this carrier which is passed through a transformer, rectified and used to drive the power transistors.

Transistors 124 and 126 in switch control circuit 24 are alternately turned "ON" and "OFF" by a 20-kilohertz oscillator 128. When transistor 124, for example, is "ON," current can flow through diode 130, the upper half of the primary winding of transformer 132, and transistor 134 to ground. Similarly, current can flow through diode 136 and the upper half of the primary winding of transformer 138 to ground through transistor 140. When transistor 126 conducts, current can flow to ground through diode 142, the lower half of the primary winding of transformer 132 and transistor 134, or through diode 144, the lower half of the primary winding of transformer 138 and transistor 140 to ground.

When either one of the drive transformers 132 or 138 has its center tap connected to ground through transistor 134 or 140, the transformer is actuated and will supply drive to its corresponding power transistor 32 or 34 in the switches 16 and 22. The method by which the center taps are grounded will be explained hereinafter. The secondaries of transformers 132 and 138 are interconnected such that when one transformer is supplying positive base drive to one of the two transistors 32 or 34, it is also supplying negative bias to the base of the other power transistor. Diodes 146 and 148 assure that no more base drive is allowed to flow than is necessary to keep the transistor 32, for example, just in saturation. In this respect, it is desirable to limit the base drive so that the storage time and, hence, the turn-off time of the power transistors is kept at a minimum. The diodes 150 and 152 perform a similar function for the power transistor 34.

It now remains to be explained how the center taps of the transformers 132 and 138 are grounded through transistors 140 and 134. It will be noted that the bases of the two transistors 140 and 134 are connected to the two outputs of a multivibrator 154. The input to one side of the multivibrator 154 is the output of a 1-kilohertz oscillator 156. The output of the oscillator 156 is also applied to the base of transistor 158. The output pulses from the 1-kilohertz oscillator 156 will turn "ON" the multivibrator 154 and, at the same time, turn "OFF" transistor 158. When multivibrator 154 is "ON" upon receipt of a pulse from oscillator 156, transistor 140 is switched "ON"; transistor 134 is switched "OFF"; transformer 138 is activated; base drive is supplied to power transistor 34; and no power is supplied to the load 20 (i.e., the beginning of time $t_2$ in FIG. 2). It will be noted that transistor 158 comprises a shunt path or short circuit for capacitors 160 and 162. Hence, once transistor 158 is turned "OFF," the capacitors 160 and 162 charge. Taking capacitor 160, for example, it will charge until the breakdown potential of unijunction transistor 164 is reached. The time required to charge capacitor 160 to this level is determined by the error signal from the emitter of transistor 122. Once the unijunction transistor 164 fires, a signal is applied via diode 166 to the other input of the multivibrator 154, causing transistor 134 to switch "ON" and transistor 140 to switch "OFF" (i.e., the beginning of period $t_1$ in FIG. 2). In this manner, it can be seen that the variable direct current error signal controls the relative "ON" and "OFF" times of the regulator. An increase in the amplitude of the error signal will cause the pulse from unijunction transistor 164 to occur earlier and, therefore, will result in more "ON" time for the regulator (i.e., longer time periods $t_1$ in FIG. 2) and a higher output voltage. Therefore, the error signal must be inverted as shown relative to the output of the regulator. That is, as the output of the regulator increases, the error signal must decrease to cause the "ON" time to decrease and thereby tend to reduce the output.

The unijunction transistor 168 is provided to set the maximum "OFF" time of the regulator. That is, the variable resistor 170 is adjusted such that the unijunction transistor 168 will break down, supplying "ON" drive to the regulator through diode 172 just prior to the next pulse from the 1-kilohertz oscillator 156.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. In an alternating current voltage regulator, a pair of input terminals to which an input alternating current voltage to be regulated is applied, means for chopping the input alternating current voltage at a frequency higher than that of the alternating current voltage to be regulated to produce a bipolar chopped waveform across a load impedance, filter means coupled to the output of said chopping means for reconstructing a sine wave output voltage, means for sensing the amplitude of said reconstructed sine wave output voltage, and means coupled to said sensing means for controlling the "ON" and "OFF" times of said chopping means.

2. The voltage regulator of claim 1 wherein said chopping means comprises a first switch in series with said input terminals and a second switch in shunt with the output of said series switch.

3. The voltage regulator of claim 2 wherein the means for controlling the "ON" and "OFF" times of said chopping means turns said series switch "ON" when said shunt switch is "OFF" and vice versa.

4. The voltage regulator of claim 2 wherein said series and shunt switches include power semiconductors.

5. The combination of claim 1 wherein said means for sensing the amplitude of said reconstructed sine wave output voltage comprises capacitor means, means for charging said capacitor means to a voltage proportional to the peak amplitude of said sine wave output voltage, and means for discharging said capacitor means when said output sine wave voltage crosses zero.

6. The combination of claim 5 wherein said capacitor means includes two capacitors, one of said capacitors being discharged when said output sine wave voltage crosses zero in one direction and the other of said capacitors being discharged when said sine wave output voltage crosses zero in the other direction.

7. The combination of claim 2 wherein said series and shunt switches comprise power semiconductors and said means for controlling the "ON" and "OFF" times of said power semiconductors comprises a source of oscillatory voltage transformer means having primary winding means coupled to the output of said source of oscillatory voltage source, and means for rectifying the signal appearing across secondary winding means of said transformer means and for applying the rectified signal to said power semiconductors.

References Cited
UNITED STATES PATENTS

| | | | |
|---|---|---|---|
| 3,152,290 | 10/1964 | Meszaros | 323—22SC |
| 3,365,654 | 1/1968 | Johnston | 323—22(SC) |
| 3,486,042 | 12/1969 | Watrous | 323—22X(SC) |

OTHER REFERENCES

"Choppers" by B. Smith; The Electronic Engineer, March 1968; pp. 59–70.

JAMES D. TRAMMELL, Primary Examiner

G. GOLDBERG, Assistant Examiner

U.S. Cl. X.R.

307—235, 240, 297; 321—16; 323—30